(12) United States Patent
Wang

(10) Patent No.: US 10,203,769 B2
(45) Date of Patent: Feb. 12, 2019

(54) PORTABLE ELECTRONIC DEVICE

(71) Applicant: Infovision Optoelectronics (Kunshan) Co., Ltd., Kunshan, Jiangsu Province (CN)

(72) Inventor: Xuhong Wang, Kunshan (CN)

(73) Assignee: INFOVISION OPTOELECTRONICS (KUNSHAN) CO., LTD., Kunshan, Jiangsu Province (CN)

( * ) Notice: Subject to any disclaimer, the term of this patent is extended or adjusted under 35 U.S.C. 154(b) by 0 days.

(21) Appl. No.: 15/630,867

(22) Filed: Jun. 22, 2017

(65) Prior Publication Data

US 2018/0113515 A1 Apr. 26, 2018

(30) Foreign Application Priority Data

Oct. 21, 2016 (CN) .......................... 2016 1 0919703

(51) Int. Cl.
| | |
|---|---|
| *G06F 3/02* | (2006.01) |
| *G06F 3/041* | (2006.01) |
| *G06F 3/0488* | (2013.01) |
| *G06F 3/042* | (2006.01) |
| *G06F 3/044* | (2006.01) |

(52) U.S. Cl.
CPC .......... *G06F 3/0219* (2013.01); *G06F 3/0221* (2013.01); *G06F 3/0412* (2013.01); *G06F 3/0416* (2013.01); *G06F 3/04886* (2013.01); *G06F 3/042* (2013.01); *G06F 3/044* (2013.01)

(58) Field of Classification Search
None
See application file for complete search history.

(56) References Cited

U.S. PATENT DOCUMENTS

| | | | | |
|---|---|---|---|---|
| 2007/0268261 | A1* | 11/2007 | Lipson | G06F 1/1616 345/169 |
| 2014/0313168 | A1* | 10/2014 | Luo | G06F 3/0488 345/175 |
| 2018/0003428 | A1* | 1/2018 | Kwon | F25D 23/028 |

FOREIGN PATENT DOCUMENTS

| | | |
|---|---|---|
| CN | 201063156 Y | 5/2008 |
| CN | 102339205 A | 2/2012 |
| CN | 103049078 A | 4/2013 |
| CN | 103995610 A | 8/2014 |
| CN | 204066059 U | 12/2014 |
| CN | 104965669 A | 10/2015 |

(Continued)

*Primary Examiner* — Joseph R Haley
*Assistant Examiner* — Emily J Frank
(74) *Attorney, Agent, or Firm* — Cheng-Ju Chiang

(57) ABSTRACT

A portable electronic device includes a display panel disposed on a front side of the portable electronic device and a back-side keyboard disposed on a rear side of the portable electronic device. The back-side keyboard includes an icon layer and a touch sensing layer. The icon layer provides a plurality of icons. The touch sensing layer is utilized to sense the exact positions of fingers at the rear side of the portable electronic device. Each of the icons is triggered to realize an input operation of the icon when the icon is pressed by a finger from the rear side towards the front side of the portable electronic device. A user is allowed to use their longer fingers to perform an input operation from the rear side of the portable electronic device, for avoiding the drawback of using the thumbs to input and increasing the user experiences for input operation.

13 Claims, 6 Drawing Sheets

(56) References Cited

FOREIGN PATENT DOCUMENTS

| | | | |
|---|---|---|---|
| CN | 105094237 | A | 11/2015 |
| CN | 106022323 | A | 10/2016 |

\* cited by examiner

PORTABLE ELECTRONIC DEVICE

CROSS-REFERENCE TO RELATED APPLICATION

The present application is based on and claims priority of Chinese patent application No. 201610919703.3, filed on Oct. 21, 2016. The entire disclosure of the above-identified application is hereby incorporated by reference herein and made a part of this specification.

TECHNICAL FIELD

This application relates to electronic devices, and more particularly to a portable electronic device with easy operation for input operation.

BACKGROUND

With the development of technology and the progress of society, the portable electronic devices, such as smart phones, tablets, and so on, have become common necessities in daily life. In use, people are paying more attention to the user experiences the portable electronic devices have brought to them.

Taking tablets as examples, the size of the tablets currently available on the market is mainly 9 inch, 10 inch, 12 inch, etc., as shown in FIGS. 1 and 2. Regardless whether the tablet is standing vertically (referring to FIG. 1, holding the long edges of the tablet with both hands) or horizontally (referring to FIG. 2, holding the short edges of the tablet with both hands), when holding it up with both hands, the user would have difficulty in performing an input operation because the thumbs of both hands are not long enough to reach the icons located in the middle region of the tablet (as indicated in dotted lines in FIGS. 1-2).

SUMMARY

The present application provides a portable electronic device for solving the aforementioned drawback regarding the difficulty in performing the input operation because the thumbs are not long enough to reach the icons located in the middle region of the tablet when holding it up with both hands, so as to increase the user experiences of input operation.

In one aspect of the present application, a portable electronic device includes a display panel disposed on a front side of the portable electronic device and a back-side keyboard disposed on a rear side of the portable electronic device. The back-side keyboard includes an icon layer and a touch sensing layer. The icon layer provides a plurality of icons. The touch sensing layer is utilized to sense the exact positions of fingers on the rear side of the portable electronic device. Each of the icons is triggered to realize an input operation of the icon when the icon is pressed by a finger from the rear side towards the front side of the portable electronic device.

In an embodiment, the back-side keyboard further includes a keyboard controller connected with the touch sensing layer and the display panel. The touch sensing layer senses the exact positions of the fingers on the rear side of the portable electronic device and transmits signals relating to the exact positions of the fingers to the keyboard controller. The keyboard controller superimposes the positions of the fingers with the positions of the icons to form an icon-finger mapping view which dynamically shows the positions of the fingers relative to the icons. The icon-finger mapping view is displayed on the display panel.

In an embodiment, the touch sensing layer includes two circuit layout layers with a capacitance formed therebetween. As the fingers touch on the rear side of the portable electronic device, a change in capacitance is caused at the touched position between the two circuit layout layers, and the exact positions of the fingers on the rear side of the portable electronic device are obtained based upon detecting the change in capacitance.

In an embodiment, each icon of the icon layer is a capacitive icon and includes two icon plates forming a capacitance therebetween. When each icon is pressed by the fingers, a variation in capacitance is caused between the two icon plates so as to recognize the icon being pressed by the fingers through the variation in capacitance.

In an embodiment, the portable electronic device further includes a keyboard controller, wherein the keyboard controller connects with the icon layer and detects the variation in capacitance between the two icon plates of each icon.

In an embodiment, each icon of the icon layer is an optical interfered icon and includes two icon plates. The icon layer further includes a light guide layer and a light sensor layer. The two icon plates of each icon are located between the light guide layer and the light sensor layer. The light guide layer is utilized to guide light into the two icon plates. When the fingers press each icon, one of the two icon plates located adjacent to the fingers is deformed, leading to the light passing through the two icon plates to form equal thickness interference fringes. The light sensor layer is utilized to sense the equal thickness interference fringes so as to recognize the icon being pressed by the fingers.

In an embodiment, the portable electronic device further includes a keyboard controller, wherein the light sensor layer senses the equal thickness interference fringes and transmits a sensing result to the keyboard controller. The keyboard controller recognizes the icon being pressed by the fingers based upon the sensing result of the light sensor layer.

In an embodiment, the two icon plates of each icon include a first icon plate and a second icon plate respectively, the first icon plates of the icons are spaced from each other, and the second icon plates of the icons are spaced from each other.

In an embodiment, the two icon plates of each icon include a first icon plate and a second icon plate respectively, the first icon plates of the icons are integrally connected with each other, and the second icon plates of the icons are integrally connected with each other.

In an embodiment, the two icon plates of each icon include a first icon plate and a second icon plate respectively, the first icon plates of the icons are spaced from each other, and the second icon plates of the icons are spaced from each other.

In an embodiment, the two icon plates of each icon include a first icon plate and a second icon plate respectively, the first icon plates of the icons are integrally connected with each other, and the second icon plates of the icons are integrally connected with each other.

In an embodiment, the touch sensing layer and the icon layer are stacked along a thickness direction of the portable electronic device. The icon layer is disposed between the touch sensing layer and the display panel, with the touch sensing layer being disposed much closer to the rear side of the portable electronic device.

In an embodiment, the icons are divided into a plurality of groups distributed in different regions on the rear side of the portable electronic device.

In an embodiment, the portable electronic device further includes a plurality of protrusions formed on the rear side of the portable electronic device, wherein each of the protrusions corresponds to the position of an icon of the icon layer.

In an embodiment, the portable electronic device is a smart phone or a tablet.

In another aspect of the present application, a portable electronic device includes a display panel disposed on a front side of the portable electronic device and a back-side keyboard disposed on a rear side of the portable electronic device. The back-side keyboard includes an icon layer, a touch sensing layer, and a keyboard controller. The icon layer provides a plurality of icons. The a touch sensing layer is utilized to sense the exact positions of fingers on the rear side of the portable electronic device. The keyboard controller is connected with the icon layer, the touch sensing layer and the display panel. The touch sensing layer senses the exact positions of the fingers on the rear side of the portable electronic device and transmits signals relating to the exact positions of the fingers to the keyboard controller. The keyboard controller superimposes the positions of the fingers with the positions of the icons to form an icon-finger mapping view which dynamically shows the positions of the fingers relative to the icons, and the icon-finger mapping view is displayed on the display panel for helping a user to locate the fingers on the desired icons needed to be inputted. Each of the desired icons is triggered to realize an input operation of the icon when the icon is pressed by a finger from the rear side towards the front side of the portable electronic device.

In an embodiment, the touch sensing layer and the icon layer are stacked along a thickness direction of the portable electronic device. The icon layer is disposed between the touch sensing layer and the display panel, with the touch sensing layer being disposed more closer to the rear side of the portable electronic device.

In an embodiment, the portable electronic device is a smart phone or a tablet.

The portable electronic device allows the user to perform the input operation from the rear side of the portable electronic device. When performing the input operation from the rear side by holding the portable electronic device, the fingers except for the thumbs touch on the surface of the rear side, the touch sensing layer senses the exact positions of the fingers placed on the surface of the rear side, and an icon-finger mapping view reflecting the relationship of relative positions between the fingers and the icons is formed and displayed on the display panel at the front side of the portable electronic device. Through observing and using the icon-finger mapping view, the user can immediately and precisely move his/her fingers on the rear side of the portable electronic device to the desired icons currently needed to be inputted. After the fingers have moved to the desired icons currently needed to be inputted, the input operation of the icons are realized using the fingers to press the icons from the rear side towards the front side of the portable electronic device. Thus, the user is allowed to use their longer fingers (i.e. forefinger, middle finger, ring finger, and little finger) to perform the input operation from the rear side of the portable electronic device, for avoiding the drawback of difficult input using the thumbs to reach the middle icons on the front side of the portable electronic device and therefore increasing the user experiences for input operation.

Other novel features and advantages will become more apparent from the following detailed description when taken in conjunction with the accompanying drawings.

DETAILED DESCRIPTION OF PREFERRED EMBODIMENTS

The present application will now be described more specifically with reference to the following embodiments. It is to be noted that the following descriptions of preferred embodiments of this application are presented herein for the purposes of illustration and description only; it is not intended to be exhaustive or to be limited to the precise form disclosed.

Figure 1:
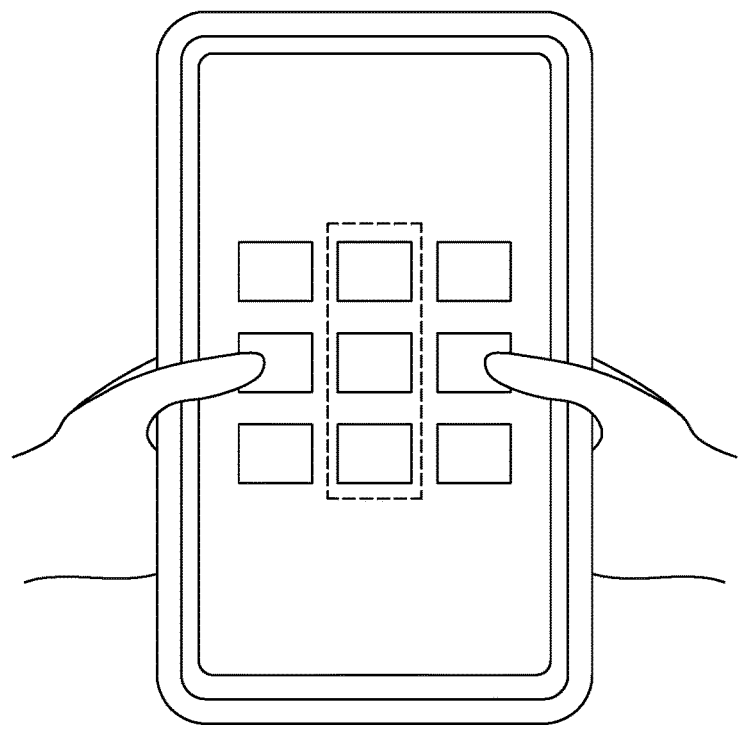
FIG. 1 illustrates a front view of a tablet in a vertical use status in which the long edges of the tablet are held with both hands.
Figure 2:
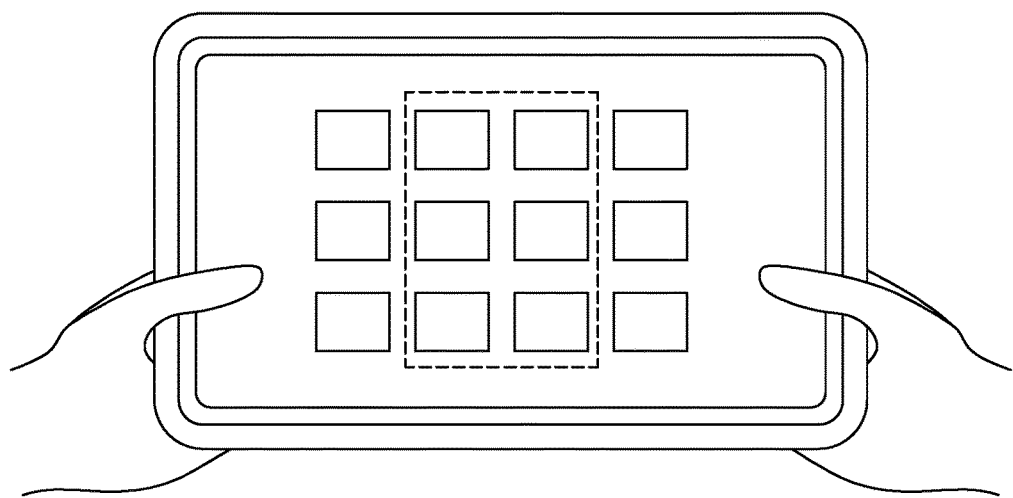
FIG. 2 illustrates a front view of the tablet in a horizontal use status in which the short edges of the tablet are held with both hands.
Figure 3:
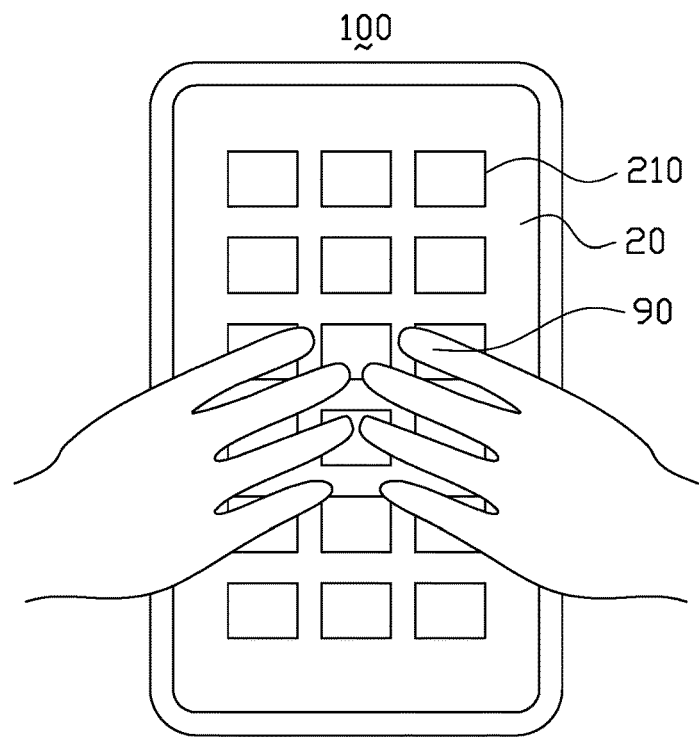
FIG. 3 illustrates a rear view of an exemplary portable electronic device in a vertical use status in accordance with an embodiment of the present application.
Figure 4:
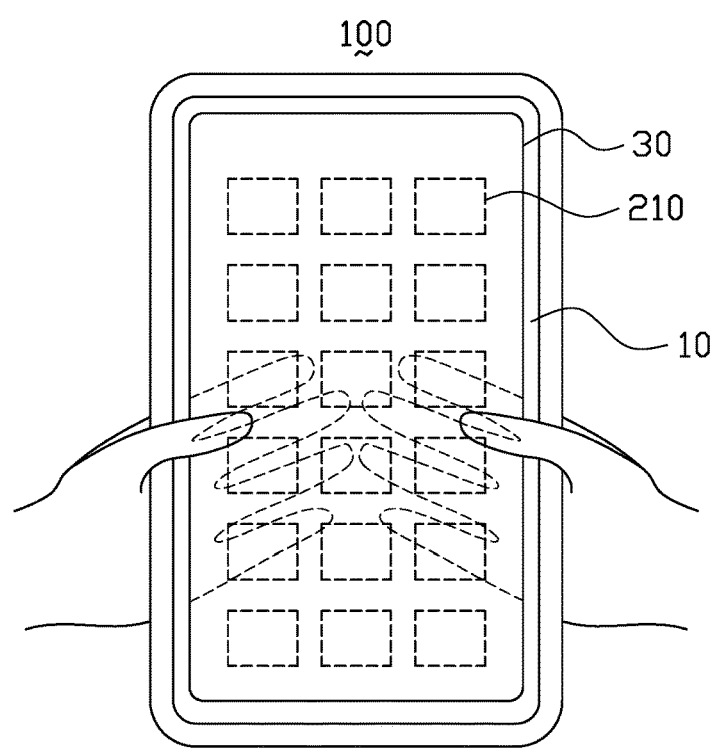
FIG. 4 illustrates a front view of the exemplary portable electronic device in the vertical use status in accordance with the embodiment of the present application.
Figure 8:
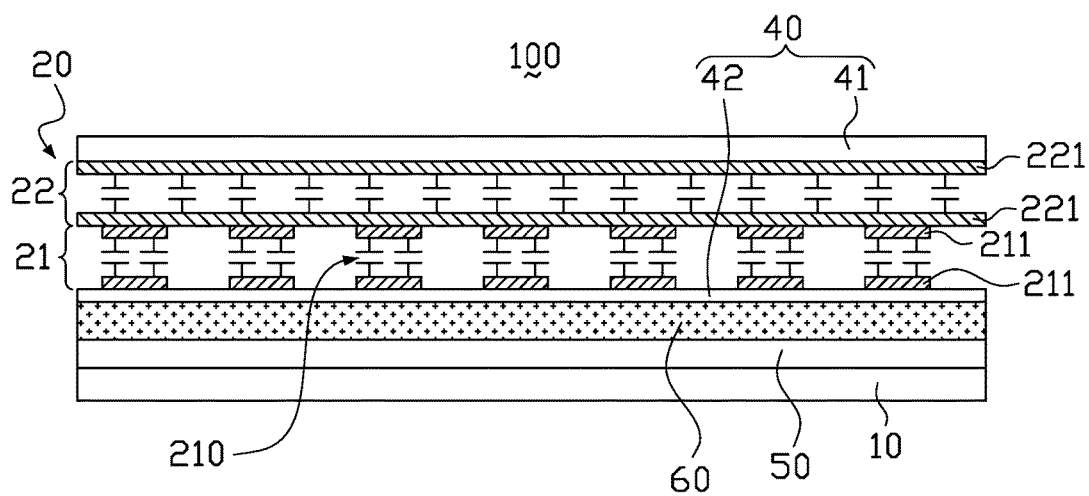
FIG. 8 illustrates a cross-sectional view of the exemplary portable electronic device in accordance with the embodiment of the present application.

FIG. 3 illustrates a rear view of an exemplary portable electronic device in a vertical use status in accordance with an embodiment of the present application; FIG. 4 illustrates a front view of the exemplary portable electronic device in the vertical use status in accordance with the embodiment of the present application; FIG. 8 illustrates a cross-sectional view of the exemplary portable electronic device in accordance with the embodiment of the present application. Referring to FIGS. 3-4 and 8, in this embodiment, the portable electronic device 100 is, for example, a smart phone, or a tablet, etc. The portable electronic device 100 includes a display panel 10 and a back-side keyboard 20, respectively provided on the front side and the rear side thereof. The input operation, such as typing, can be realized by using the back-side keyboard 20 of the portable electronic device 100.

The back-side keyboard 20 includes an icon layer 21 having a plurality of icons 210 spaced from each other. The icons 210 can be flexibly arranged on the rear side of the portable electronic device 100 in accordance with different input methods, and the icons 210 correspond respectively to the different keys, such as letters, numbers, symbols, and functional keys (e.g., "shift," "ctrl," "enter", and so on). When the user performs the input operation from the rear side of the portable electronic device 100 held by both hands of the user, the fingers of the user's both hands except for the thumbs touch on the rear side of the portable electronic device 100. Each icon 210 is triggered to realize the input of the icon 210 as it is pressed by user's fingers 90 from the rear side towards the front side of the portable electronic device 100.

Because the icons 210 of the icon layer 21 are located at the rear side of the portable electronic device 100, the icons 210 are structurally shielded by the display panel 10 disposed on the front side. Thus, the icons 210 cannot be seen by the user from the front side as the portable electronic device 100 is in use. However, most users cannot remember the locations of all of the icons 210 of the back-side keyboard 20. As a result, when performing the input operation from the rear side, the user cannot immediately and precisely locate his/her fingers 90 (i.e., forefinger, middle finger, ring finger, and little finger) onto the desired icons 210 that are needed to be inputted.

To solve the aforementioned drawback, as shown in FIG. 4, the back-side keyboard 20 further includes a touch sensing layer 22 to sense the exact positions of the user's fingers 90 on the rear side of the portable electronic device 100. The positions of the user's fingers 90 sensed by the touch sensing layer 22 are superimposed with the positions of the icons 210 to form an icon-finger mapping view 30 which dynamically shows the positions of the fingers 90 relative to the icons 210, and the icon-finger mapping view 30 is displayed on the display panel 10 provided on the front side of the portable electronic device 100.

Hence, when performing the input operation from the rear side, the user can immediately recognize the exact positions of the back fingers 90 through observing the icon-finger mapping view 30 displayed on the display panel 10, so as to rapidly and precisely move the back fingers 90 to the exact icons 210 currently needed to be inputted, to increase the efficiency of input operation. After the back fingers 90 have moved to the exact icons 210 currently needed to be inputted, the input operation of the desired icons 210 is realized through pressing the desired icons 210 from the back side toward the front side using the back fingers 90.

Figure 5:
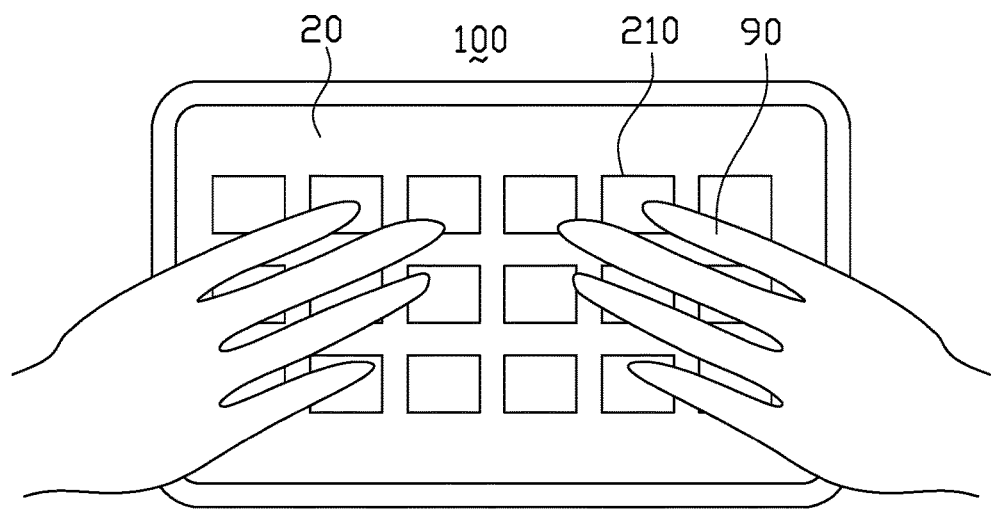
FIG. 5 illustrates a rear view of the exemplary portable electronic device in a horizontal use status in accordance with the embodiment of the present application.
Figure 6:
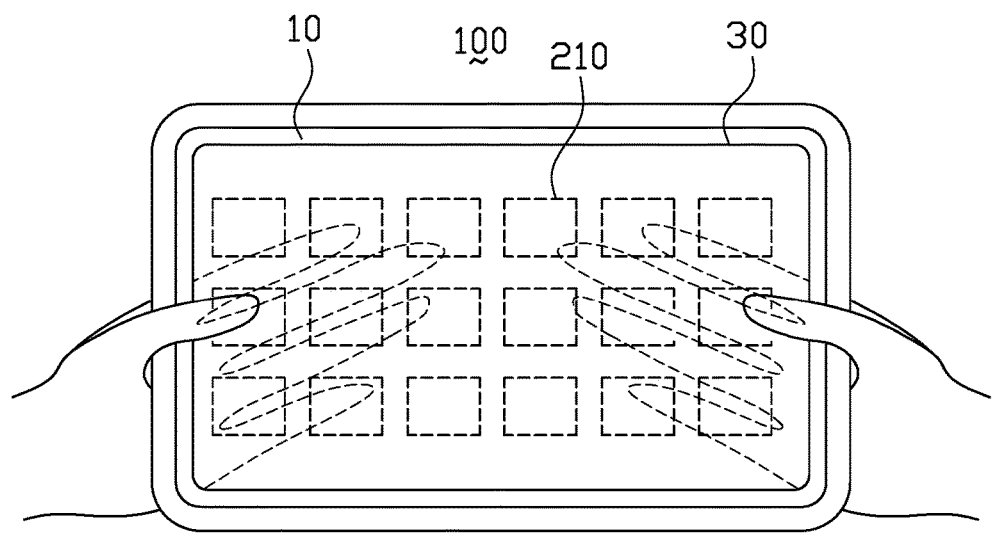
FIG. 6 illustrates a front view of the exemplary portable electronic device in the horizontal use status in accordance with the embodiment of the present application.
Figure 7:
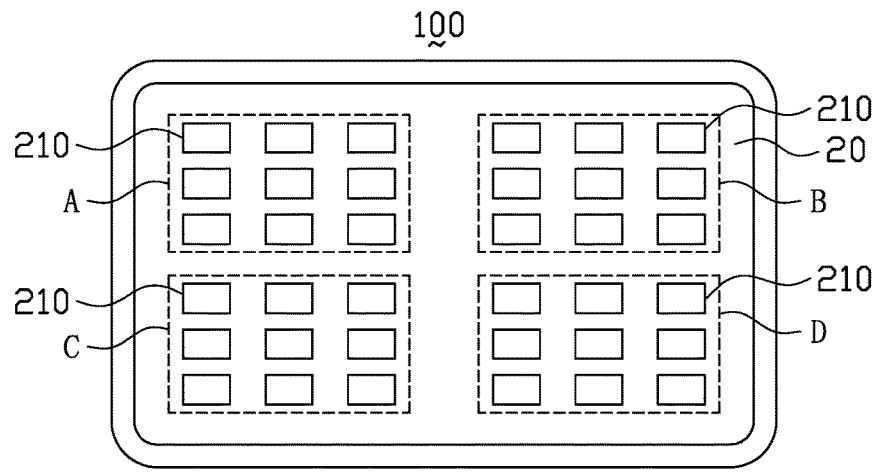
FIG. 7 illustrates an arrangement of the keys of a back-side keyboard of the exemplary portable electronic device in accordance with the embodiment of the present application.

In this embodiment, when the user performs the input operation from the rear side, it can be realized when the portable electronic device 100 is held in a vertical use status in which the user holds the long edges of the portable electronic device 100 (as shown in FIGS. 3-4). Or, the input operation can also be realized when the portable electronic device 100 is held in a horizontal use status in which the user holds the short edges of the portable electronic device 100 (as shown in FIGS. 5-6). In another embodiment, the icons 210 can be divided into a plurality of groups in accordance with the different fingers of both hands so that the fingers except for the thumbs of both hands can correspond to the different groups of the icons, respectively. For example, as shown in FIG. 7, the icons 210 can be divided into four groups A, B, C and D and distributed in different regions on the rear side of the portable electronic device 100, so as to allow the different fingers of both hands to perform the input operation from the rear side conveniently when the portable electronic device 100 is held vertically or horizontally.

The back-side keyboard 20 is disposed on the rear side of the portable electronic device 100, and the back-side keyboard 20 includes the icon layer 21 and the touch sensing layer 22. The touch sensing layer 22 issued to detect the exact positions of the fingers 90 as the user is performing the input operation by the fingers 90 from the rear side, and the exact positions of the fingers 90 corresponding to the icons 210 on the rear side can be displayed on the display panel 10 by using the icon-finger mapping view 30. Thus, when performing the input operation, the user can immediately and precisely locate his/her fingers 90 on the desired icons 210 by observing and using the icon-finger mapping view 30.

Consequently, after the back fingers 90 on the rear side have moved to the desired icons 210, the input operation such as a typing function can be realized when the icons 210 are pressed from the rear side towards the front side of the portable electronic device 100 by the fingers 90. As a result, in this embodiment, the user can use their longer fingers 90 (i.e. forefinger, middle finger, ring finger and little finger) to realize the input operation from the rear side of the portable electronic device 100, for avoiding the drawback of difficult input using the thumbs to reach the middle icons on the front side of the portable electronic device 100 and therefore increasing the user experiences for input operation.

Notably, the input operation from the rear side by both hands also does not affect the other normal functions of the portable electronic device 100. For example, a task can be activated by the thumbs from the front side of the portable electronic device 100 when an input operation is being executed from the rear side. Therefore, the portable electronic device 100 can perform multi-tasks, but not be affected by the input operation from the rear side. In addition, when the fingers 90 touch on the screen of the display panel 10, the fingerprints may be left on the front side, resulting in poor watching effect on the screen. In this embodiment, the fingerprints on the screen can be avoided because the input operation is performed from the rear side.

Figure 9:
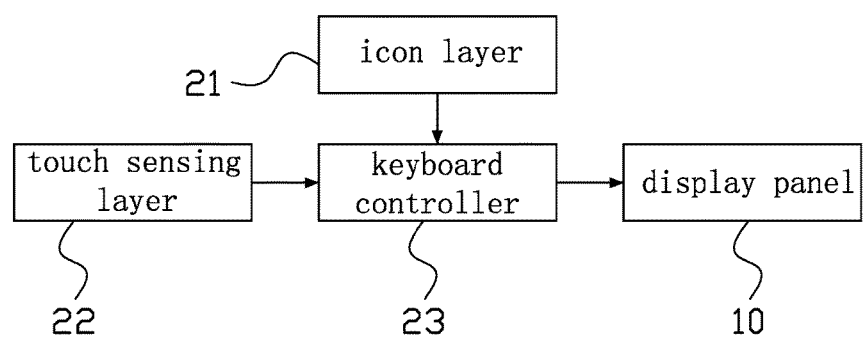
FIG. 9 is a block diagram showing that a touch sensing layer detects an exact position touched by fingers in accordance with the embodiment of the present application.

Particularly, the touch sensing layer 22 includes two circuit layout layers 221, each of which provides circuit traces (not shown) thereon. The two circuit layout layers 221 are formed a capacitance therebetween. As the user's fingers 90 touch on the rear side of the portable electronic device 100, a change in capacitance is caused at the touched position between the two circuit layout layers 221. As shown in FIG. 9, a block diagram is depicted. The back-side keyboard 20 further includes a keyboard controller 23 connected with the touch sensing layer 22 and the display panel 10. The touch sensing layer 22 senses the exact positions of the fingers 90 on the rear side of the portable electronic device 100, and transmits signals regarding the exact positions of the fingers 90 to the keyboard controller 23. The keyboard controller 23 superimposes the positions of the fingers 90 with the positions of the icons 210 to form the icon-finger mapping view 30, and the icon-finger mapping view 30 is then displayed on the display panel 10.

When the user's fingers 90 touch on the rear side of the portable electronic device 100, it will cause a change in capacitance at the touched position. Through the change of capacitance, the touch sensing layer 22 senses the exact positions of the fingers 90 on the rear side of the portable electronic device 100, and transmits the signals relating to the exact positions of the fingers 90 to the keyboard controller 23. Then, the keyboard controller 23 superimposes the positions of the fingers 90 with the positions of the icons 210 to form the icon-finger mapping view 30, and the icon-finger mapping view 30 is then displayed on the display panel 10. By observing and using the icon-finger mapping view 30, the user can easily recognize the relationship of the relative positions between the fingers 90 and the icons 210 while performing the input operation from the rear side. Thus, the user can rapidly and precisely move his/her fingers 90 to the desired icons 210 by observing and using the icon-finger mapping view 30 which dynamically shows the positions of the fingers 90 relative to the icons 210.

Figure 10:
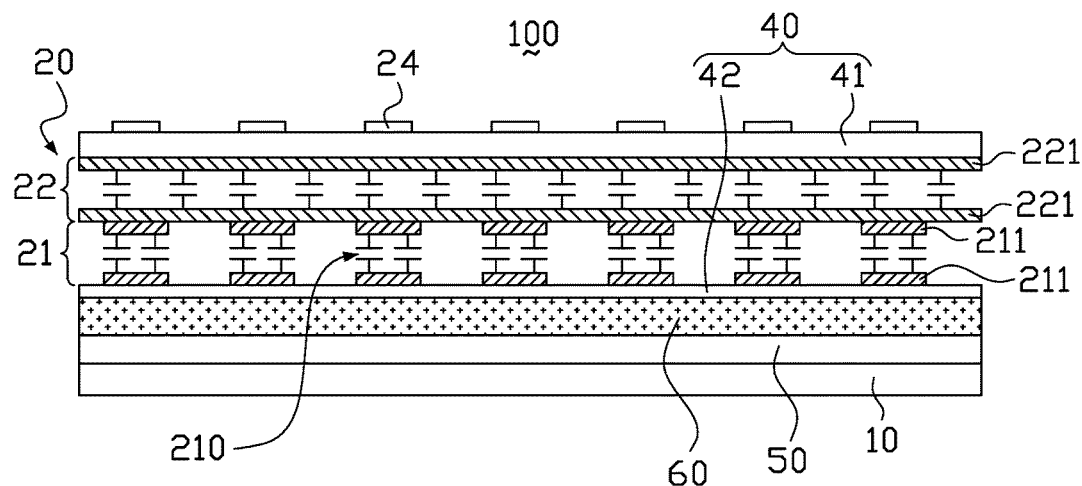
FIG. 10 illustrates a cross-sectional view of an exemplary portable electronic device in accordance with another embodiment of the present application.
Figure 11:
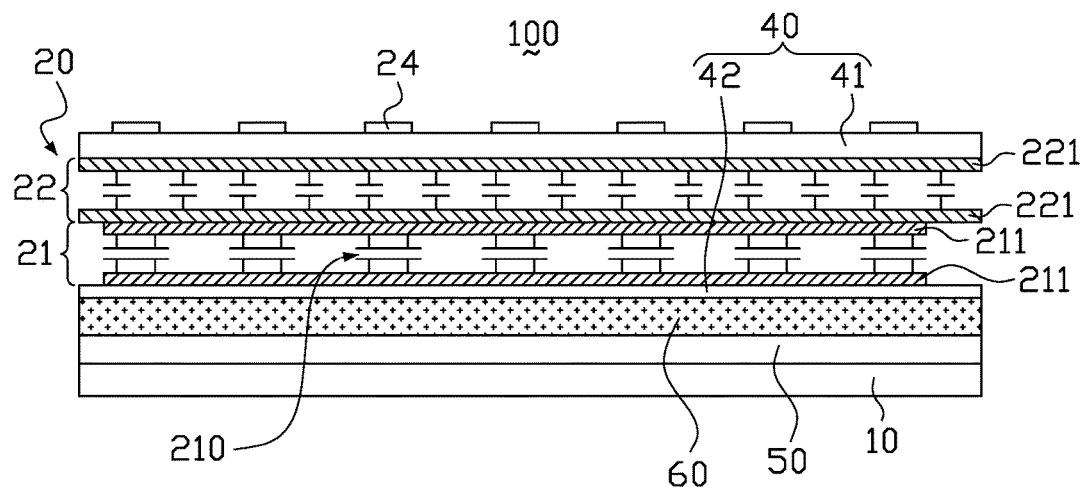
FIG. 11 illustrates a cross-sectional view of an exemplary portable electronic device in accordance with yet another embodiment of the present application.

Specifically, as shown in FIGS. 8, 10 and 11, in some embodiments, these icons 210 disposed in the icon layer 21 can be capacitive icons. Each icon 210 includes two icon plates 211. A capacitance is formed between the two icon plates 211. When the user's fingers 90 press each icon 210 from the rear side towards the front side of the portable electronic device 100, it will cause a variation in distance between the two icon plates 211, thereby leading to a variation in capacitance therebetween. As shown in FIG. 9, the keyboard controller 23 further connects with the icon layer 21 and detects the variation in capacitance between the two icon plates 211 of each icon 210 to recognize the exact icon 210 the user's finger shave pressed.

Figure 12:
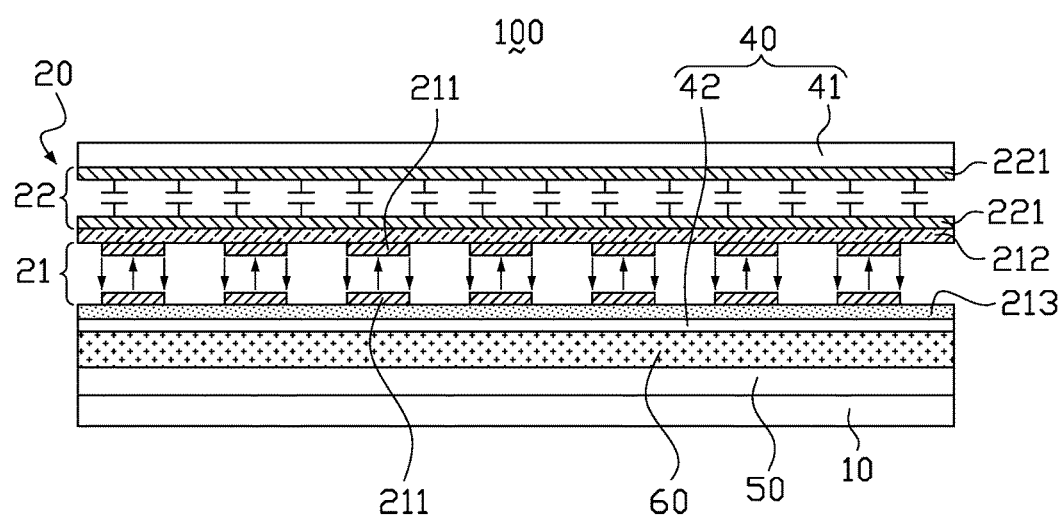
FIG. 12 illustrates a cross-sectional view of an exemplary portable electronic device in accordance with a further embodiment of the present application.

FIG. 12 shows another embodiment. The icons 210 disposed in the icon layer 21 can be optical interfered icons. The pressing detection of the icon 210 can be realized by using the optical principle of the equal thickness interference. Each icon 210 of the icon layer 21 includes two icon plates 211. The icon layer 21 further includes a light guide layer 212 and a light sensor layer 213. The two icon plates 211 of each icon 210 are located between the light guide layer 212 and the light sensor layer 213. The light guide layer 212 is utilized to guide light into the two icon plates 211 of each icon 210. When the user's fingers 90 press each icon 210 from the rear side towards the front side of the portable electronic device 100, it will cause a deformation to one of the two icon plates 211 which is located adjacent to the fingers, thereby leading to the light passing through the two icon plates 211 to form the equal thickness interference fringes. The light sensor layer 213 (e.g., a CCD light sensor) is utilized to sense the equal thickness interference fringes generated by the light passing through the two icon plates 211 and transmit a sensing result to the keyboard controller 23. The keyboard controller 23 recognizes the exact icon 210 the users' fingers have pressed based upon the sensing result transmitted by the light sensor layer 213.

The two icon plates 211 of each icon 210 includes a first icon plate and a second icon plate, respectively, as shown in FIGS. 8, 10 and 12. The first icon plates of these icons 210 are spaced from each other. Similarly, The second icon plates of theses icons 210 are also spaced from each other. Alternatively, as shown in FIG. 11, the first icon plates of these icons 210 can be integrally connected with each other. Similarly, The second icon plates of these icons 210 can also be integrally connected with each other.

As shown in FIGS. 8 and 12, the rear side of the portable electronic device 100 can be flat or smooth. As shown in FIGS. 10 and 11, alternatively, a plurality of protrusions with each corresponding to the position of an icon 210 are provided on the rear side of the portable electronic device 100. The provision of the protrusions can assist the fingers 90 to easily locate the icons 210 beneath the protrusions so as to increase the input efficiency when the user performs the input operation from the rear side.

Referring to FIGS. 8, and 10-12, the touch sensing layer 22 and the icon layer 21 are stacked along a thickness direction (i.e., the Z-axial direction) of the portable electronic device 100, and the icon layer 21 is disposed between the touch sensing layer 22 and the display panel 10. That is, the touch sensing layer 22 is disposed more closer to the rear side of the portable electronic device 100, such that the user's fingers 90 can be more closer to the touch sensing layer 22 to improve the sensitivity and the precision when the touch sensing layer 22 performs the detection of the finger positions.

Please refer to FIGS. 8, and 10-12 again, the portable electronic device 100 further includes a protecting frame 40. The protecting frame 40 includes an upper frame 41 and a lower frame 42. The back-side keyboard 20 is fastened between the upper frame 41 and the lower frame 42 to constitute a whole structure. The protecting frame 40 can be used to protect the back-side keyboard 20 and is detachably assembled to the portable electronic device 100 by interlock or fasteners. When the protecting frame 40 and the back-side keyboard 20 are disassembled, the removing or the replacing operation of a battery 60 can be proceeded. Thereafter, the protecting frame 40 and the back-side keyboard 20 can be reassembled together again.

Additionally, an integrated circuit board 50 and the above battery 60 are provided between the back-side keyboard 20 and the display panel 10. The battery 60 is electrically connected with the integrated circuit board 50 and utilized to provide the power for the portable electronic device 100. The keyboard controller 23 can be disposed on the integrated circuit board 50.

The aforementioned embodiments of the portable electronic device 100 allow the user to perform the input operation from the rear side of the portable electronic device 100. When performing the input operation from the rear side by holding the portable electronic device 100, the fingers 90 except for the thumbs touch on the surface of the rear side, the touch sensing layer 22 senses the exact positions of the fingers 90 placed on the surface of the rear side, and an icon-finger mapping view 30 reflecting the relationship of relative positions between the fingers 90 and the icons 210 is formed and displayed on the display panel 10 at the front side of the portable electronic device 100. Through observing and using the icon-finger mapping view 30, the user can immediately and precisely move his/her fingers 90 on the rear side of the portable electronic device 100 to the desired icons 210 currently needed to be inputted.

After the fingers 90 have moved to the desired icons 210 currently needed to be inputted, the input operation of the icons 210 are realized using the fingers 90 to press the icons 210 from the rear side towards the front side of the portable electronic device 100. Thus, the user is allowed to use their longer fingers 90 (i.e. forefinger, middle finger, ring finger, and little finger) to perform the input operation from the rear side of the portable electronic device 100, for avoiding the drawback of difficult input using the thumbs to reach the middle icons on the front side of the portable electronic device 100 and therefore increasing the user experiences for input operation.

While the present application is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the application and the scope of the following claims.

What is claimed is:

1. A portable electronic device comprising:
a display panel disposed on a front side of the portable electronic device; and
a back-side keyboard disposed on a rear side of the portable electronic device, the back-side keyboard comprising:
an icon layer providing a plurality of icons, wherein each icon of the icon layer is an optical interfered icon and comprises two icon plates, the icon layer further comprises a light guide layer and a light sensor layer, the two icon plates of each icon are located between the light guide layer and the light sensor layer, the light guide layer is utilized to guide light into the two icon plates, when the fingers press each icon, one of the two icon plates located adjacent to the fingers is deformed, leading to the light passing through the two icon plates to form equal thickness interference fringes, and the light sensor layer is utilized to sense the equal thickness interference fringes so as to recognize the icon being pressed by the fingers; and
a touch sensing layer utilized to sense the exact positions of fingers on the rear side of the portable electronic device;
wherein each of the icons is triggered to realize an input operation of the icon when the icon is pressed by a finger from the rear side towards the front side of the portable electronic device.

2. The portable electronic device of claim 1, wherein the back-side keyboard further comprises a keyboard controller connected with the touch sensing layer and the display panel, the touch sensing layer senses the exact positions of the fingers on the rear side of the portable electronic device and transmits signals relating to the exact positions of the fingers to the keyboard controller, the keyboard controller superimposes the positions of the fingers with the positions of the icons to form an icon-finger mapping view which dynamically shows the positions of the fingers relative to the icons, and the icon-finger mapping view is displayed on the display panel.

3. The portable electronic device of claim 1, wherein the touch sensing layer comprises two circuit layout layers with a capacitance formed therebetween, as the fingers touch on the rear side of the portable electronic device, a change in capacitance is caused at the touched position between the two circuit layout layers, the exact positions of the fingers on the rear side of the portable electronic device are obtained based upon detecting the change in capacitance.

4. The portable electronic device of claim 1, further comprising a keyboard controller, wherein the light sensor layer senses the equal thickness interference fringes and transmits a sensing result to the keyboard controller, the keyboard controller recognizes the icon being pressed by the fingers based upon the sensing result of the light sensor layer.

5. The portable electronic device of claim 1, wherein the two icon plates of each icon include a first icon plate and a second icon plate respectively, the first icon plates of the icons are spaced from each other, and the second icon plates of the icons are spaced from each other.

6. The portable electronic device of claim 1, wherein the two icon plates of each icon include a first icon plate and a second icon plate respectively, the first icon plates of the icons are integrally connected with each other, and the second icon plates of the icons are integrally connected with each other.

7. The portable electronic device of claim 1, wherein the touch sensing layer and the icon layer are stacked along a thickness direction of the portable electronic device, the icon layer is disposed between the touch sensing layer and the display panel, with the touch sensing layer being disposed much closer to the rear side of the portable electronic device.

8. The portable electronic device of claim 1, wherein the icons are divided into a plurality of groups distributed in different regions on the rear side of the portable electronic device.

9. The portable electronic device of claim 1, further comprising a plurality of protrusions formed on the rear side of the portable electronic device, wherein each of the protrusions corresponds to the position of an icon of the icon layer.

10. The portable electronic device of claim 1, wherein the portable electronic device is a smart phone or a tablet.

11. A portable electronic device comprising:
a display panel disposed on a front side of the portable electronic device; and
a back-side keyboard disposed on a rear side of the portable electronic device, the back-side keyboard comprising:
an icon layer providing a plurality of icons, wherein each icon of the icon layer is an optical interfered icon and comprises two icon plates, the icon layer further comprises a light guide layer and a light sensor layer, the two icon plates of each icon are located between the light guide layer and the light sensor layer, the light guide layer is utilized to guide light into the two icon plates, when the fingers press each icon, one of the two icon plates located adjacent to the fingers is deformed, leading to the light passing through the two icon plates to form equal thickness interference fringes, and the light sensor layer is utilized to sense the equal thickness interference fringes so as to recognize the icon being pressed by the fingers; and
a touch sensing layer utilized to sense the exact positions of fingers on the rear side of the portable electronic device; and
a keyboard controller connected with the icon layer, the touch sensing layer and the display panel;
wherein the touch sensing layer senses the exact positions of the fingers on the rear side of the portable electronic device and transmits signals relating to the exact positions of the fingers to the keyboard controller, the keyboard controller superimposes the positions of the fingers with the positions of the icons to form an icon-finger mapping view which dynamically shows the positions of the fingers relative to the icons, and the icon-finger mapping view is displayed on the display panel for helping a user to locate the fingers on the desired icons needed to be inputted;
wherein each of the desired icons is triggered to realize an input operation of the icon when the icon is pressed by a finger from the rear side towards the front side of the portable electronic device.

12. The portable electronic device of claim 11, wherein the touch sensing layer and the icon layer are stacked along a thickness direction of the portable electronic device, the icon layer is disposed between the touch sensing layer and the display panel, with the touch sensing layer being disposed much closer to the rear side of the portable electronic device.

13. The portable electronic device of claim 11, wherein the portable electronic device is a smart phone or a tablet.

\* \* \* \* \*